United States Patent
Weber et al.

(10) Patent No.: US 7,173,907 B1
(45) Date of Patent: Feb. 6, 2007

(54) VOICE OVER ATM AAL2 BANDWIDTH ALLOCATION METHODOLOGY

(75) Inventors: Walter Weber, Olathe, KS (US); Khoi Nguyen, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1024 days.

(21) Appl. No.: 10/201,375

(22) Filed: Jul. 23, 2002

(51) Int. Cl.
*H04L 12/26* (2006.01)
(52) U.S. Cl. .................. 370/230; 370/352; 370/395.21
(58) Field of Classification Search ...................... None
See application file for complete search history.

(56) References Cited

U.S. PATENT DOCUMENTS

| | | | | |
|---|---|---|---|---|
| 5,872,769 | A * | 2/1999 | Caldara et al. ............. | 370/230 |
| 6,046,981 | A * | 4/2000 | Ramamurthy et al. ...... | 370/232 |
| 6,097,722 | A * | 8/2000 | Graham et al. ........ | 370/395.21 |
| 6,212,163 | B1 * | 4/2001 | Aida ........................... | 370/230 |
| 6,381,244 | B1 * | 4/2002 | Nishimura et al. .... | 370/395.21 |
| 7,046,631 | B1 * | 5/2006 | Giroux et al. .............. | 370/234 |
| 7,068,659 | B1 * | 6/2006 | Hamedani et al. ....... | 370/395.2 |
| 2002/0131422 | A1 * | 9/2002 | Chu et al. .................. | 370/352 |

* cited by examiner

*Primary Examiner*—Chau Nguyen
*Assistant Examiner*—Phuongchau Ba Nguyen

(57) ABSTRACT

Method and apparatus for allocating bandwidth in a virtual channel connection. The number of fax calls expected in a trunk group is divided by the number of DS0s in the trunk group and multiplied by the number of DS0s in a subset of the trunk group. The result equals the number of fax call circuits for the subset. The number of voice call circuits for the subset equals the number of DS0s in the subset minus the number of fax call circuits for the subset. The number of fax call circuits is multiplied by the full DS0 bandwidth. The number of voice call circuits is multiplied by the bandwidth per voice call. The total bandwidth for the subset equals the bandwidth for fax calls plus the bandwidth for voice calls. These steps are repeated for other subsets entering an interface to determine the total bandwidth needed by the VCC.

18 Claims, 3 Drawing Sheets

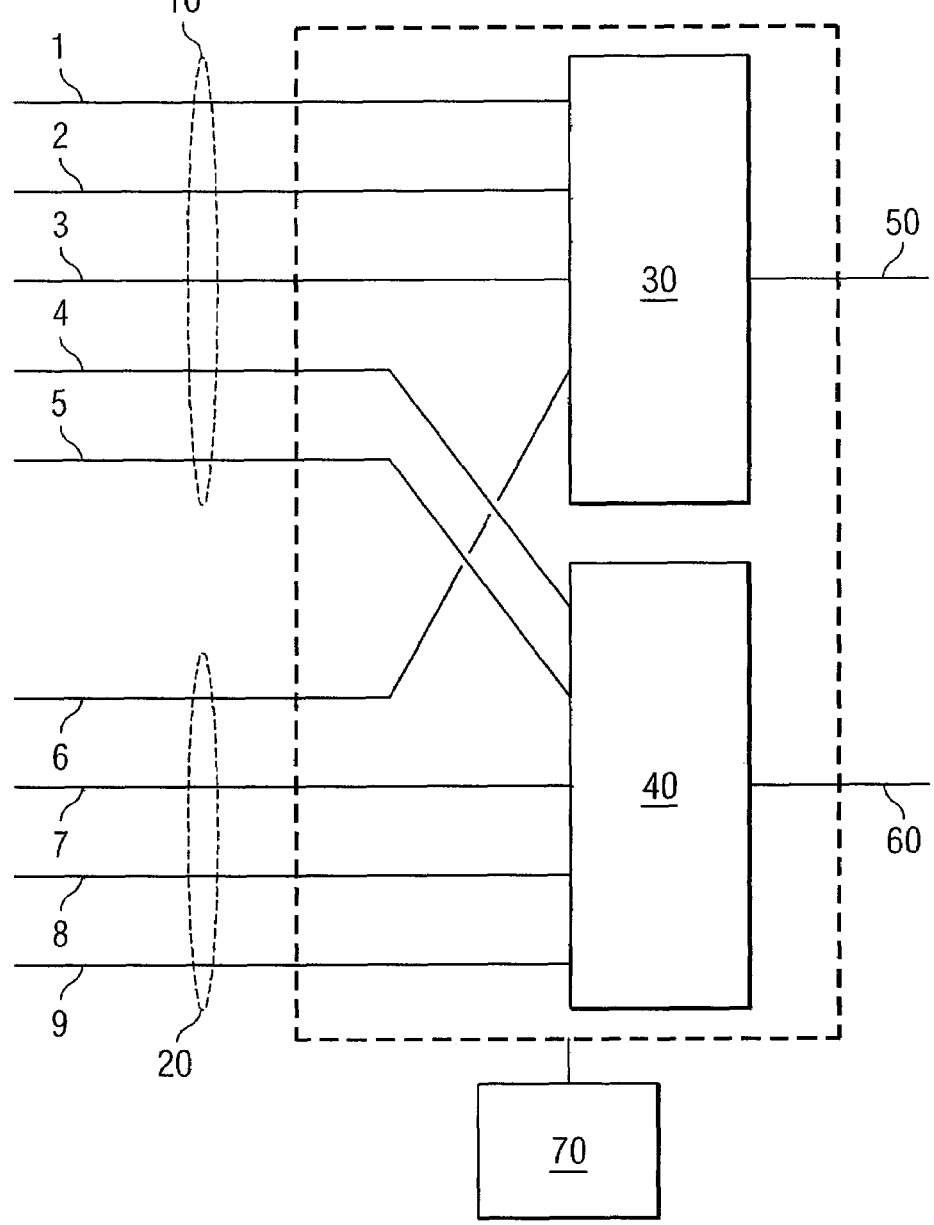

VOICE OVER ATM AAL2 BANDWIDTH ALLOCATION METHODOLOGY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to high-speed data transmission and more particularly to the allocation of bandwidth in asynchronous transfer mode transmissions.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In an effort to increase the amount and speed of information transmitted across networks, the telecommunications industry is shifting toward broadband packet networks designed to carry a variety of services such as voice, data, and video. For example, asynchronous transfer mode (ATM) networks have been developed to provide broadband transport and switching capability between local area networks (LANs) and wide area networks (WANs). One technology used to provide high-speed data transfer services to individual telephone customers is Voice over Asynchronous Transmission Mode using ATM Adaptation Layer 2 (VoAAL2).

Data transmitted via the VoAAL2 technology typically interfaces with a customer's equipment that uses the DS1 format. DS1 is a signal format that comprises up to 24 individual circuits called DS0s. Each DS0 uses 64 kilobits per second of bandwidth and typically contains a voice call, a fax call, or other voice-band data such as a computer modem call. A fax call requires the full 64k bandwidth. Voice calls may pass through a coding/decoding device (codec) that can perform data compression on the call. If no data compression is performed the voice call requires the full 64k bandwidth. With data compression the voice call requires less than the full 64k of bandwidth. DS0s are often grouped into trunk groups wherein all DS0s in a group have the same value of codec data compression. A trunk group supports a specific set of features and functionality. For example, a trunk group may use dual-tone multifrequency to dial digits and may provide incoming call termination only, while another trunk group may use dial pulses to dial digits and may provide outgoing call origination only.

Protocol conversion elements are typically present at a customer's premises to serve as an interface between the customer's DS1 equipment and the VoAAL2 service. Suitable conversion interfaces include the MGX 8850 manufactured by Cisco and the Passport 6480 manufactured by Nortel. A transmission of data in the VoAAL2 format will be referred to as a VoAAL2 circuit. A group of VoAAL2 circuits that is the output of a single conversion interface is known as an ATM virtual channel connection (VCC). Multiple VoAAL2 circuits are typically present in a VCC. Multiple interfaces may be present into which multiple groups of DS0s may be input and from which multiple VCCs may be output. When a group of DS0s enters a set of interfaces to be converted to the VoAAL2 format, all of the DS0s in one trunk group do not necessarily pass through the same interface. A customer may specify that some of the DS0 circuits in a trunk group should enter one interface and other circuits in the group should enter another interface. A customer can also specify the maximum number of fax calls likely to occur within a trunk group and the codec compression type for a trunk group. When multiple trunk groups are present, a different codec compression type could be used for each trunk group. If the DS0s within a trunk group are sent to different interfaces, a single interface could receive DS0s having different types of codec compression. Thus, a single VCC could carry faxes coming from different trunk groups and voice calls with different levels of data compression.

If all calls used the same bandwidth, calculating the total bandwidth on a line with multiple calls would simply be a matter of multiplying the bandwidth of each call by the number of calls. When multiple calls on a single line have disparate levels of data compression, such a straightforward calculation is not possible. The bandwidth of each call must be taken into account to determine the total bandwidth for the line. It would be desirable to have a method to determine the bandwidth needed by a VCC based on the number of fax calls and the codec types of the voice calls on the DS0s entering an interface.

SUMMARY OF THE INVENTION

The present invention discloses a method and apparatus for allocating bandwidth in a virtual channel connection. The ratio of the number of fax calls expected in a trunk group to the total number of DS0s in the trunk group is determined. This ratio is multiplied by the number of DS0s in a subset of the trunk group. When the result of the multiplication is not a whole number, the result is rounded up to the next highest whole number. The result is set equal to the number of circuits on a virtual channel connection that are dedicated to fax calls from the subset. Next, the number of circuits on a virtual channel connection that are dedicated to voice calls from the subset is set equal to the number of DS0s in the subset minus the number of circuits dedicated to fax calls from the subset. The number of circuits dedicated to fax calls is multiplied by the full bandwidth of a DS0 connection to determine the bandwidth needed for fax calls. The number of circuits dedicated to voice calls is multiplied by the bandwidth per voice call as determined by the level of codec compression on the trunk group to determine the bandwidth needed for voice calls. The bandwidth needed for fax calls is added to the bandwidth needed for voice calls to determine the total bandwidth needed for the subset. The above steps are repeated for other subsets entering an interface to determine the total bandwidth needed by the virtual channel connection.

BRIEF DESCRIPTION OF THE DRAWINGS

FIG. 3 is a block diagram showing a logic module located externally to and coupled to a set of interfaces.

DETAILED DESCRIPTION OF THE PREFERRED EMBODIMENTS

The present invention provides a method and apparatus for allocating the bandwidth needed for a virtual channel connection (VCC). When a set of DS0 circuit trunk groups is to be converted to a VCC, the DS0s within a trunk group can be sent to different conversion interfaces. A customer typically specifies which DS0 circuits in which trunk groups are to be sent to which conversion interfaces. The customer can also specify the maximum number of simultaneous fax calls that are likely to be carried by a trunk group and the level of codec compression for the voice calls within the trunk group. The VCC exiting the interface must have sufficient bandwidth to handle the fax calls and voice calls it carries. This bandwidth depends on the number of fax calls and voice calls to be carried by the VCC and the level of data compression for the voice calls.

Figure 1:
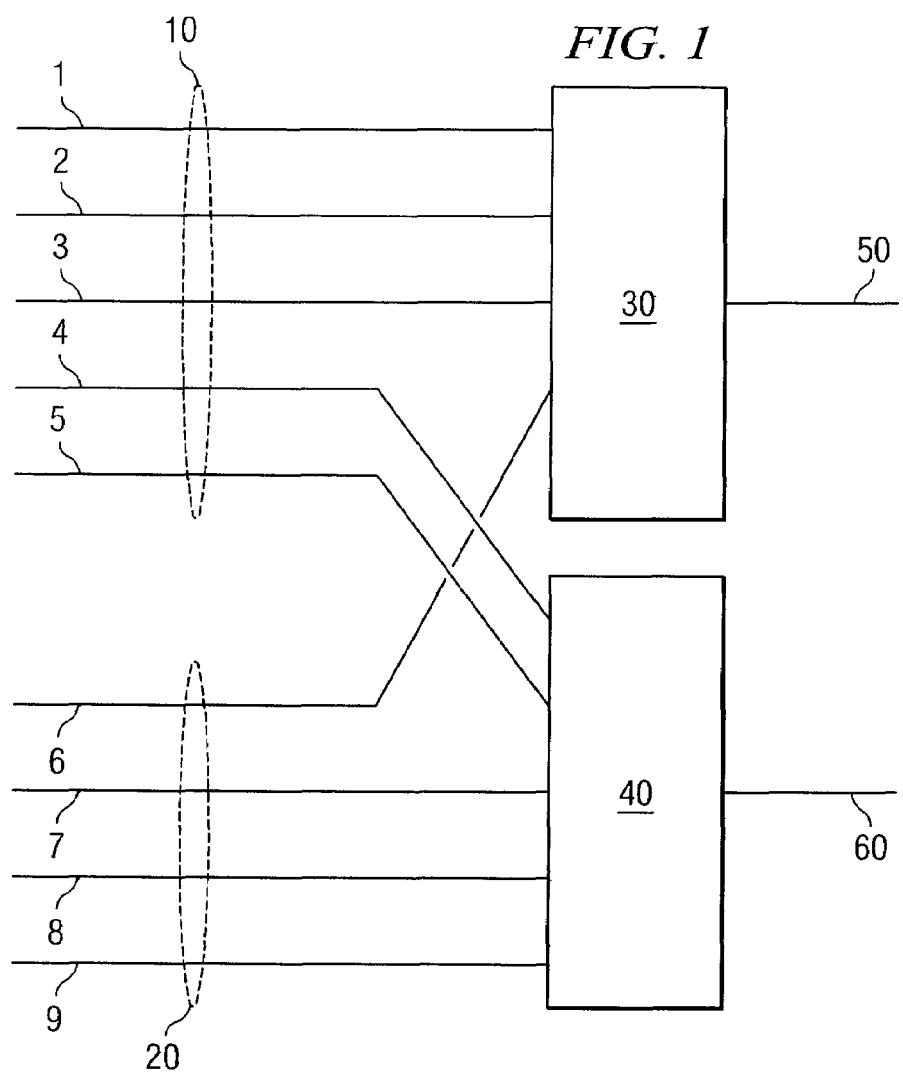
FIG. 1 is a block diagram showing two interfaces converting two DS0 trunk groups to two virtual channel connections.

An embodiment of the invention can best be understood by referring to FIG. 1. Trunk group 10 comprises DS0s 1, 2, 3, 4, and 5. Trunk group 20 comprises DS0s 6, 7, 8, and 9. DS0s 1, 2, and 3 from trunk group 10 enter interface 30 while DS0s 4 and 5 from trunk group 10 enter interface 40. DS0 6 from trunk group 20 enters interface 30 while DS0s 7, 8, and 9 from trunk group 20 enter interface 40. A subset of a trunk group can be defined as all of the DS0s from the trunk group that enter a single interface. Thus, DS0s 1, 2, and 3 can be considered one subset of trunk group 10 and DS0s 4 and 5 can be considered another subset of trunk group 10. DS0 6 can be considered one subset of trunk group 20 and DS0s 7, 8, and 9 can be considered another subset of trunk group 20. Protocol conversion interfaces 30 and 40 convert the DS0 signals to the VoAAL2 format and produce VCCs 50 and 60 as output. VCC 50 must be configured with enough bandwidth to carry the data from DS0s 1, 2, 3, and 6. VCC 60 must be configured with enough bandwidth to carry the data from DS0s 4, 5, 7, 8, and 9.

In an embodiment of the present invention, the number of circuits on VCC 50 budgeted to fax calls from the subset of DS0s 1, 2, and 3 can be calculated by first dividing the number of fax calls on trunk group 10 by the total number of DS0s in the trunk group. This ratio is then multiplied by the number of DS0s in the subset. For example, if a customer specified that trunk group 10 must handle two fax calls, then the number of circuits on VCC 50 budgeted to fax calls from the subset of DS0s 1, 2, and 3 would be the number of fax calls on the trunk group (2) divided by the total number of DS0s in the trunk group (5) multiplied by the number of DS0s in the subset (3). This gives (2/5)*3=1.2. This is rounded up to the next whole number, 2. Thus, two circuits on VCC 50 would be dedicated to fax calls from the subset of DS0s 1, 2, and 3. The number of circuits on VCC 50 dedicated to voice calls from the subset of DS0s 1, 2, and 3 is equal to the number of DS0s in the subset minus the number of circuits dedicated to fax calls. In this case, the number of circuits dedicated to voice calls would be the number of DS0s in the subset (3) minus the number of circuits dedicated to fax calls (2). Thus, one circuit on VCC 50 would be dedicated to voice calls from the subset of DS0s 1, 2, and 3.

A similar calculation can be performed for the other subset of DS0s entering interface 30, namely DS0 6. If, for example, the customer specifies that one fax call will be carried by trunk group 20, then the number of circuits on VCC 50 budgeted to fax calls from the subset of DS0 6 would be the number of fax calls on the trunk group (1) divided by the total number of DS0s in the trunk group (4) multiplied by the number of DS0s in the subset (1). This gives (1/4)*1=0.25. This is rounded up to the next whole number, 1. Thus, one circuit on VCC 50 would be dedicated to fax calls from the subset of DS0 6. The number of circuits dedicated to voice calls would be the number of DS0s in the subset (1) minus the number of circuits dedicated to fax calls (1). Thus, zero circuits on VCC 50 would be dedicated to voice calls from the subset of DS0 6.

In total then, VCC 50 would carry three fax circuits (two from the subset of DS0s 1, 2, and 3 and one from the subset of DS0 6) and one voice circuit (one from the subset of DS0s 1, 2, and 3 and zero from the subset of DS0 6). If a similar calculation is performed for VCC 60 on interface 40, it will be found that VCC 60 would carry two fax circuits (one from the subset of DS0s 4 and 5 and one from the subset of DS0s 7, 8, and 9) and three voice circuits (one from the subset of DS0s 4 and 5 and two from the subset of DS0s 7, 8, and 9).

To extend the example, a customer might specify that the voice circuits on trunk group 10 have a codec data compression level of one half and the voice circuits on trunk group 20 have a codec data compression level of one fourth. That is, a voice circuit on trunk group 10 would need only half of the full 64k DS0 bandwidth, or 32k, and a voice circuit on trunk group 20 would need only a fourth of the full 64k DS0 bandwidth, or 16k. The total bandwidth needed by each VCC can now be calculated. VCC 50 carries three fax calls at 64k each for 192k dedicated to fax calls. VCC 50 also carries one voice call from trunk group 10, which needs 32k. Therefore, at least 192k+32k or 224k of bandwidth must be allocated to VCC 50. VCC 60 carries two fax calls at 64k each for 128k dedicated to fax calls. VCC 60 also carries three voice calls, one from trunk group 10, which needs 32k, and two from trunk group 20, which need 16k each. Therefore, at least 128k+32k+(2*16k) or 192k of bandwidth must be allocated to VCC 60. To further ensure sufficient capacity, more bandwidth than calculated could be allocated to each VCC.

Figure 2:
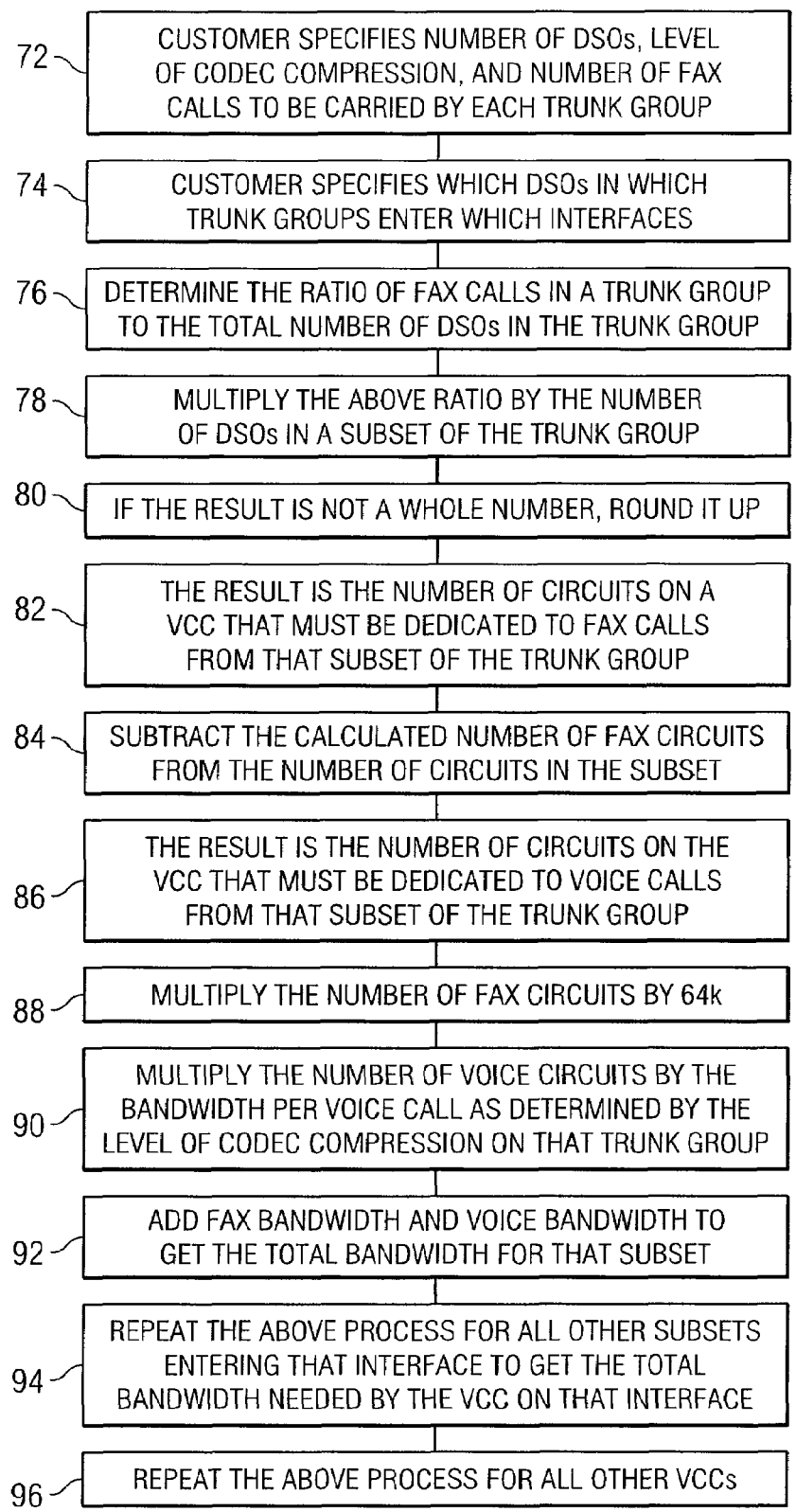
FIG. 2 is a flow chart showing a set of steps that could be taken in the allocation of bandwidth for a virtual channel connection.

A set of steps that could be taken by an embodiment of the invention is shown in FIG. 2. In box 72, a customer specifies the number of DS0s, the level of codec compression, and the maximum number of fax calls to be carried by each trunk group. In box 74, the customer specifies which DS0s in which trunk groups enter which interfaces. In box 76, the ratio of fax calls in a trunk group to the total number of DS0s in the trunk group is determined. The ratio is multiplied by the number of DS0s in a subset of the trunk group in box 78. In box 80, if the result is not a whole number, it is rounded up. As shown in box 82, the result is the number of circuits on a VCC that must be dedicated to fax calls from that subset of the trunk group. The calculated number of fax circuits is subtracted from the number of circuits in the subset in box 84. As shown in box 86, the result is the number of circuits on the VCC that must be dedicated to voice calls from that subset of the trunk group. To obtain the total bandwidth needed by fax calls, the number of fax circuits is multiplied by the full bandwidth of a DS0 circuit (64k) in box 88. In box 90, to obtain the total bandwidth needed by voice calls, the number of voice circuits with a particular bandwidth is multiplied by the bandwidth per voice call as determined by the level of codec compression on that trunk group. The fax bandwidth and the voice bandwidth are added in box 92 to get the total bandwidth for that subset. In box 94, the above process is repeated for all other subsets entering that interface to get the total bandwidth needed by the VCC on that interface. In box 96, the above process is repeated for all other VCCs.

In an embodiment of the invention, a logic module performs the calculations described above. The logic module could automatically receive data regarding the number of fax calls to be carried, the number of DS0s entering each interface, and other relevant information. Alternatively, this information could be manually input into the logic module. After receiving the data, the logic module carries out the above calculations. Based on the results of the calculations, the logic module could automatically set up the appropriate configurations on the outputs of the conversion interfaces. Alternatively, the logic module could designate the appropriate output configurations, which would then be implemented manually. As shown in FIG. 3, a logic module 70 could be located externally to the interfaces and have appropriate connections to the inputs and outputs of the interfaces. Alternatively, a logic module could be located internally to one or more of the interfaces.

In an alternative embodiment, an interface can be configured to utilize multiple VCCs. In this case, the total bandwidth required per interface can be proportioned to each of the multiple VCCs. The amount of bandwidth per VCC can be determined by dividing the total bandwidth by the number of VCCs. Alternately, to allow a safety margin, the amount of bandwidth per VCC could be modified by a factor to increase the amount of bandwidth per VCC.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for determining bandwidth for a virtual channel connection (VCC) comprising:
   determining the bandwidth for fax calls to be handled on the VCC;
   determining the bandwidth for voice calls to be handled on the VCC; and
   adding the bandwidth for fax calls and the bandwidth for voice calls to determine a total bandwidth for the VCC
   wherein the step of determining the bandwidth for fax calls to be handled on the VCC comprises:
   determining the number of circuits on the VCC to be dedicated to fax calls;
   multiplying the number of circuits dedicated to fax calls by the full bandwidth of a DS0 connection to determine the bandwidth needed for fax calls;
   wherein the step of determining the number of circuits on the VCC to be dedicated to fax calls comprises:
   determining a ratio of the number of fax calls expected in a trunk group to the total number of DS0s in the trunk group;
   multiplying the ratio by the number of DS0s in a subset of the trunk group;
   when the result of the multiplication is not a whole number, rounding the result upto the next highest whole number;
   repeating the process for each subset coupled to the VCC;
   summing the results from each subset; and
   setting the sum of the results equal to the number of circuits on the VCC that are dedicated to fax calls.

2. The method of claim 1 further comprising:
   allocating the total bandwidth for the VCC.

3. The method of claim 1 wherein the step of determining the bandwidth for voice calls to be handled on the VCC comprises:
   determining the number of circuits on the VCC to be dedicated to voice calls;
   determining the bandwidth needed per voice call; and
   multiplying the number of circuits dedicated to voice calls by the bandwidth per voice call to determine the bandwidth needed for voice calls.

4. The method of claim 1 wherein the step of determining the bandwidth needed per voice call comprises:
   multiplying the number of circuits dedicated to voice calls by the full bandwidth of a DS0 connection and the level of codec compression on the trunk group.

5. The method of claim 4 wherein the step of determining the number of circuits on the VCC to be dedicated to voice calls comprises:
   determining the number of circuits on the VCC to be dedicated to fax calls from a subset of DS0s in a trunk group;
   setting the number of circuits on the VCC that are dedicated to voice calls from the subset equal to the number of DS0s in the subset minus the number of circuits dedicated to fax calls from the subset;
   repeating the process for each subset coupled to the VCC;
   summing the results from each subset; and
   setting the sum of the results equal to the number of circuits on the VCC that are dedicated to voice calls.

6. The method of claim 1 further comprising the step of adding additional bandwidth to the total bandwidth for the VCC to further ensure sufficient available bandwidth for all fax and voice calls.

7. A method for allocating bandwidth in a VCC comprising:
   determining the ratio of the number of fax calls expected in a trunk group to the total number of DS0s in the trunk group;
   multiplying the ratio by the number of DS0s in a subset of the trunk group;
   when the result of the multiplication is not a whole number, rounding the result up to the next highest whole number;
   setting the result equal to the number of circuits on a VCC that are dedicated to fax calls from the subset;
   setting the number of circuits on a VCC that are dedicated to voice calls from the subset equal to the number of DS0s in the subset minus the number of circuits dedicated to fax calls from the subset;

multiplying the number of circuits dedicated to fax calls by the full bandwidth of a DS0 connection to determine the bandwidth needed for fax calls;

multiplying the number of circuits dedicated to voice calls by the bandwidth per voice call as determined by the level of codec compression on the trunk group to determine the bandwidth needed for voice calls;

adding the bandwidth needed for fax calls to the bandwidth needed for voice calls to determine the total bandwidth needed for the subset; and repeating the above steps for other subsets entering an interface to determine the total bandwidth needed by the VCC.

8. The method of claim 7 wherein a bandwidth greater than the calculated bandwidth is allocated.

9. The method of claim 7 wherein a group of virtual channel connections is the output of a single protocol conversion interface.

10. An apparatus for determining bandwidth in a VCC comprising:

means for receiving data regarding the total number of DS0s in each trunk group of a group of trunk groups, the number of DS0s in each subset of each trunk group, the level of codec compression on each trunk group, and the number of fax calls expected in a trunk group;

means for determining the bandwidth for fax calls to be handled on the VCC based on the received data;

means for determining the bandwidth for voice calls to be handled on the VCC based on the received data; and means for adding the bandwidth for fax calls and the bandwidth for voice calls to determine a total bandwidth for the VCC wherein the means for determining the bandwidth for voice calls to be handled on the VCC comprises:

means for determining the number of circuits on the VCC to be dedicated to fax calls from a subset of DS0s in a trunk group;

means for setting the number of circuits on the VCC that are dedicated to the voice calls from the subset equal to the number of DS0s in the subset minus the number of circuits dedicated to fax calls from the subset;

means for repeating the process for each subset coupled to the VCC;

means for summing the results from each subset;

means for setting the sum of the result equal to the number of circuits on the VCC that are dedicated to voice calls;

means for multiplying the number of circuits dedicated to voice calls by the full bandwidth of a DS0 connection and the level of codec compression on the trunk group to determine the bandwidth needed per voice call; and means for multiplying the number of circuits dedicated to voice calls by the bandwidth per voice call to determine the bandwidth needed for voice calls.

11. The apparatus of claim 10 wherein the means for determining the bandwidth for fax calls to be handled on the VCC comprises:

means for determining a ratio of the number of fax calls expected in a trunk group to the total number of DS0s in the trunk group;

means for multiplying the ratio by the number of DS0s in a subset of the trunk group;

means for rounding the result up to the next highest whole number when the result of the multiplication is not a whole number;

means for repeating the process for each subset coupled to the VCC;

means for summing the results from each subset;

means for setting the sum of the results equal to the number of circuits on the VCC that are dedicated to fax calls; and means for multiplying the number of circuits dedicated to fax calls by the full bandwidth of a DS0 connection to determine the bandwidth needed for fax calls.

12. The apparatus of claim 10 wherein the means for determining the number of circuits on the VCC to be dedicated to fax calls from a subset of DS0s in a trunk group comprises:

means for determining a ratio of the number of fax calls expected in a trunk group to the total number of DS0s in the trunk group;

means for multiplying the ratio by the number of DS0s in a subset of the trunk group;

means for when the result of the multiplication is not a whole number, rounding the result up to the next highest whole number; and means for setting the result equal to the number of circuits on a virtual channel connection that are dedicated to fax calls from the subset.

13. The apparatus of claim 10 further comprising:

means for allocating the total bandwidth for the VCC.

14. The apparatus of claim 10 further comprising means for adding additional bandwidth to the total bandwidth for the VCC to further ensure sufficient available bandwidth for all fax and voice calls.

15. The apparatus of claim 10 wherein the data is received into the apparatus automatically.

16. The apparatus of claim 10 wherein the data is received into the apparatus after being input manually by a user of the apparatus.

17. The apparatus of claim 10 wherein the apparatus is external to a set of conversion interfaces.

18. The apparatus of claim 10 wherein the apparatus is internal to a conversion interface.

* * * * *